United States Patent
Zhao et al.

(10) Patent No.: US 8,264,475 B2
(45) Date of Patent: Sep. 11, 2012

(54) ELECTRONIC DEVICE WITH INFRARED TOUCH INPUT FUNCTION

(75) Inventors: Xin Zhao, Shenzhen (CN); Zu-Pei He, Shenzhen (CN); Ruey-Shyang You, Taipei Hsien (TW); Hua-Dong Cheng, Shenzhen (CN); Han-Che Wang, Taipei Hsien (TW); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 328 days.

(21) Appl. No.: 12/545,876

(22) Filed: Aug. 24, 2009

(65) Prior Publication Data
US 2010/0171710 A1 Jul. 8, 2010

(30) Foreign Application Priority Data
Jan. 5, 2009 (CN) .......................... 2009 1 0300037

(51) Int. Cl.
*G06F 3/042* (2006.01)
(52) U.S. Cl. ........................................................ 345/175
(58) Field of Classification Search .................. None
See application file for complete search history.

(56) References Cited

U.S. PATENT DOCUMENTS
5,414,413 A * 5/1995 Tamaru et al. ................. 345/175
2002/0175900 A1* 11/2002 Armstrong ..................... 345/173

FOREIGN PATENT DOCUMENTS
| TW | 262467 | 9/2006 |
| TW | 200811697 | 3/2008 |
| TW | 200717294 | 5/2008 |
| TW | 346865 | 12/2008 |

OTHER PUBLICATIONS

Paul Barna, Ateve Schlanger, "Fundamentals of the Infrared Physival Layer", Nov. 24, 2003, http://ww1.microchip.com/downloads/en/appnotes/00243a.pdf.

* cited by examiner

*Primary Examiner* — Wayne Young
*Assistant Examiner* — Brian Butcher
(74) *Attorney, Agent, or Firm* — Altis Law Group, Inc.

(57) ABSTRACT

An electronic device with infrared touch input function is provided. The electronic device includes a display unit defining an signal display area; an infrared input device including a circuit board having two pairs of oppositely disposed sides defining an open area corresponding in size and shape to the signal display area, at least one light emitting device positioned on the circuit board, configured for emitting infrared light; at least one light detecting device positioned on the circuit board, configured for detecting infrared light emitted; a micro-processing unit configured for controlling the at least one light emitting device to emit infrared light, detecting infrared light paths obstructed via the light detecting devices, sending information of the obstructed infrared light paths to a central processing unit(CPU); and the CPU configured for performing functions according to the information of the obstructed infrared light paths.

12 Claims, 10 Drawing Sheets

ELECTRONIC DEVICE WITH INFRARED TOUCH INPUT FUNCTION

BACKGROUND

1. Related Applications

This application is related to copending applications Ser. No. 12/545,873, entitled, "ELECTRONIC DEVICE WITH INFRARED TOUCH INPUT FUNCTION", filed on Aug. 24, 2009, Ser. No. 12/545,874, entitled, "ELECTRONIC DEVICE WITH INFRARED TOUCH INPUT FUNCTION", filed on Aug. 24, 2009; and Ser. No. 12/545,875, entitled "ELECTRONIC DEVICE WITH INFRARED TOUCH INPUT FUNCTION", filed on Aug. 24, 2009.

2. Technical Field

The disclosure relates to electronic devices with an input function and, particularly, to an electronic device with infrared touch input function.

3. General Background

It is well known that an infrared input system comprises a circuit board having a first pair of opposed sides positioned parallel to a first axis and a second pair of opposed sides positioned parallel to a second axis, the second axis being perpendicular to the first axis, each of the second pair of sides connecting the first pair of sides, all four sides defining a generally rectangular touch input area, a linear array of light emitting devices along each side, and a light detection device positioned at each corner of the circuit board; and a controller coupled to the light emitting devices and the light detection devices, wherein the controller sequentially activates each linear array and activates the light detection devices positioned at corners of the circuit board opposed to the activated array of light emitting devices. The system can discern the location of a touch within the signal display area by implementing an algorithm on x, y coordinates detected by the detectors, which is complicated and time consuming.

Therefore, it is necessary to provide a electronic device with infrared touch input function to implement the functions in a simpler way.

DETAILED DESCRIPTION

Figure 1:
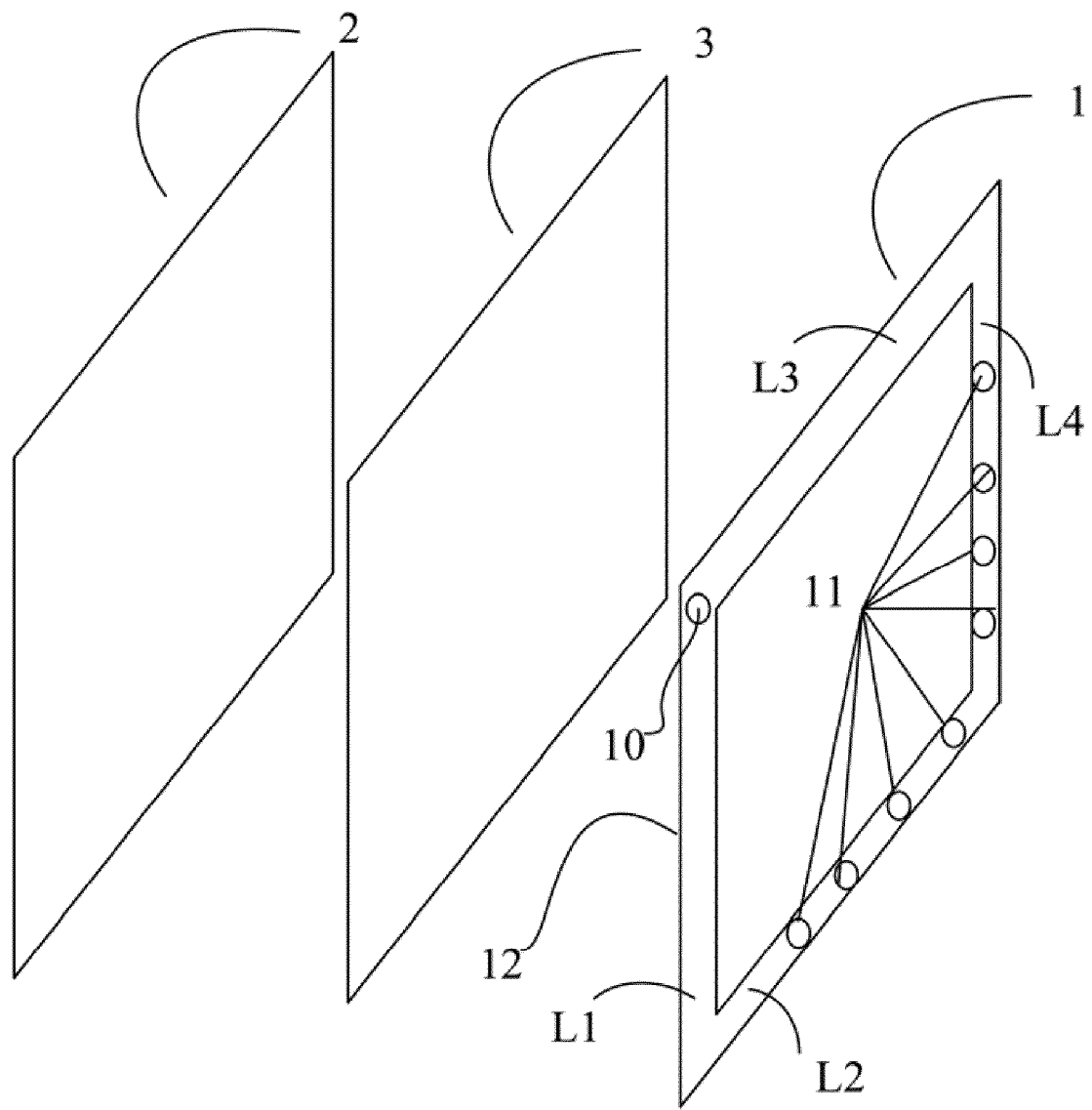
FIG. 1 is an exploded, schematic view showing an electronic device with an infrared touch input function.
Figure 2:
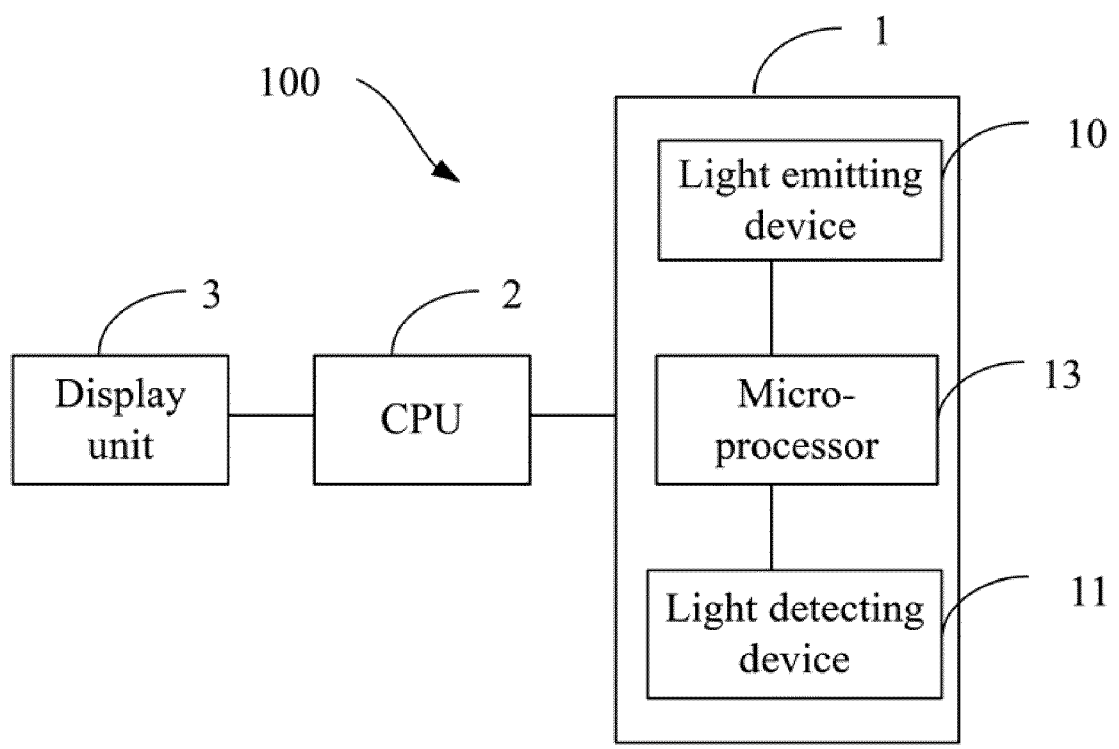
FIG. 2 is a block diagram showing the electronic device of FIG. 1.

Referring to FIGS. 1-2, the electronic device 100 includes an infrared input device 1, a central processing unit (CPU) 2, and a display unit 3.

The CPU 2 is electronically connected to the infrared input device 1 and the display unit 3. The display unit 3 may be a flat panel display defining an information display area. The infrared input device 1 may include a circuit board 12 having two pairs of oppositely disposed sides (L1, L2, L3, and L4) defining an open area corresponding in size and shape to the information display area. The circuit board 12 includes at least one light emitting device 10 and at least one light detecting device 11, and a micro-processor 13 electronically connected with the light emitting device 10 and the light detecting devices 11. In an exemplary embodiment, the light emitting devices 10 are organic light emitting diodes that emit light in the infrared (IR) range, and the light detecting devices 11 are light phototransistors. The light detecting devices 11 are used for detecting infrared light emitted by the light emitting devices 10.

The micro-processor 13 is configured to control the light emitting devices 10 emitting infrared light, determining which infrared light path is obstructed by determining which light detecting device 11 does not detect the infrared light, and sending a signal to the CPU 2 when it determines there is an infrared light path obstructed. The signal itself represents which infrared light is obstructed. The CPU 2 looks up a table that records relationship of the information of the infrared light path and corresponding function, performs the function according to the table. The information of the infrared light path includes the signal, the order and/or the number of the signals when there are two or more signals received in a predetermined time.

For example, when there is only one signal received in the predetermined time, the information is the signal itself. When there are two or more signals received in the predetermined time, the information may include two or three of the following in combination: the signals, the order of the signals, and the number of the signals. The table defines the relationship of the information of the obstructed infrared lights and corresponding functions. The table may be preset in the system, or may be set by a user.

The light detecting devices 11 are controlled to detect the infrared light one by one according to a control signal. The control signal may be repeatedly changed in a defined sequence, such as 000, 001, 010, 011, 100, 101, 110 and 111 respectively corresponding to the number of the light detecting devices 11.

FIG. 3-FIG. 6 shows some examples of the internal configuration of the electronic device of FIG. 2. Numbers of the light emitting devices 10 and the light detecting device 11 in FIG. 3-FIG. 6 may be set as needed.

Figure 3:
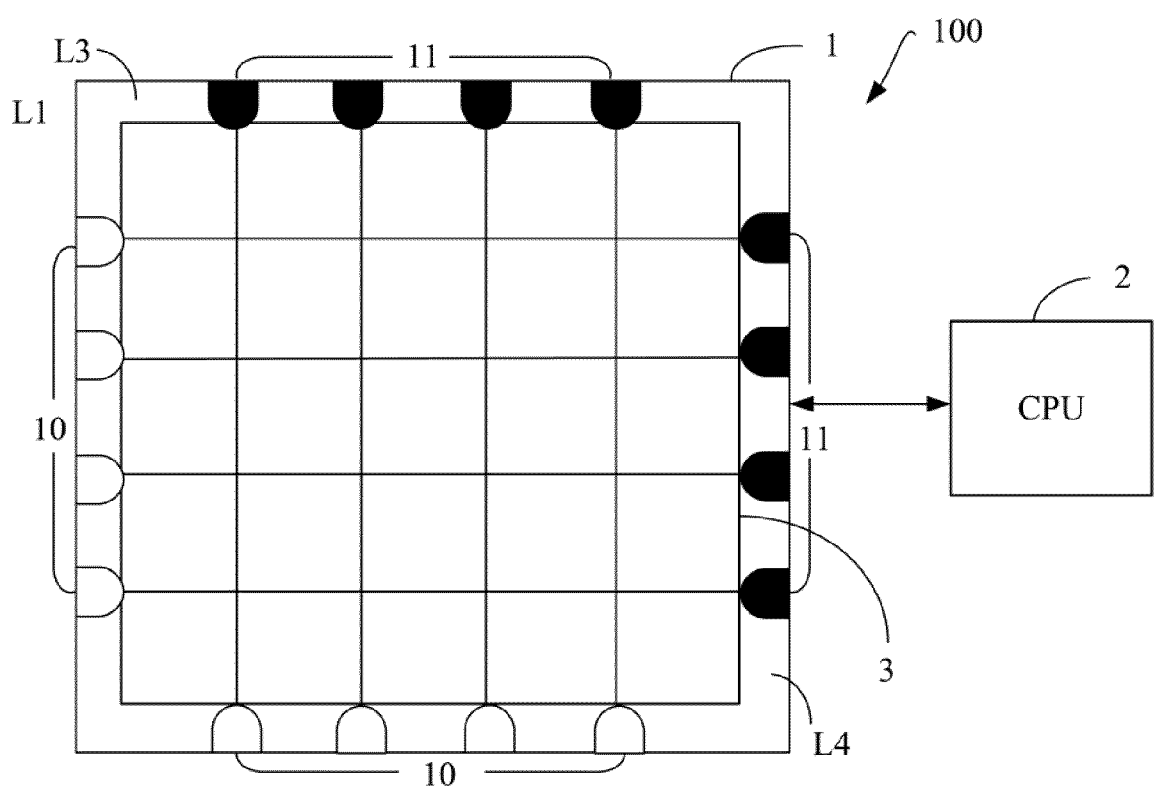
FIG. 3 is a schematic diagram showing an internal configuration of the electronic device of FIG. 2 in accordance with a first exemplary embodiment.

In FIG. 3, four light emitting devices 10 are positioned on one side of the circuit board 12 corresponding to the four light detecting devices 11 on the opposite site of the circuit board 12, another four light emitting devices 10 are positioned on the side of the circuit board 12 adjacent to the prior four light emitting devices 10 corresponding to the four light detecting devices 11 on the opposite site of the circuit board 12.

Figure 4:
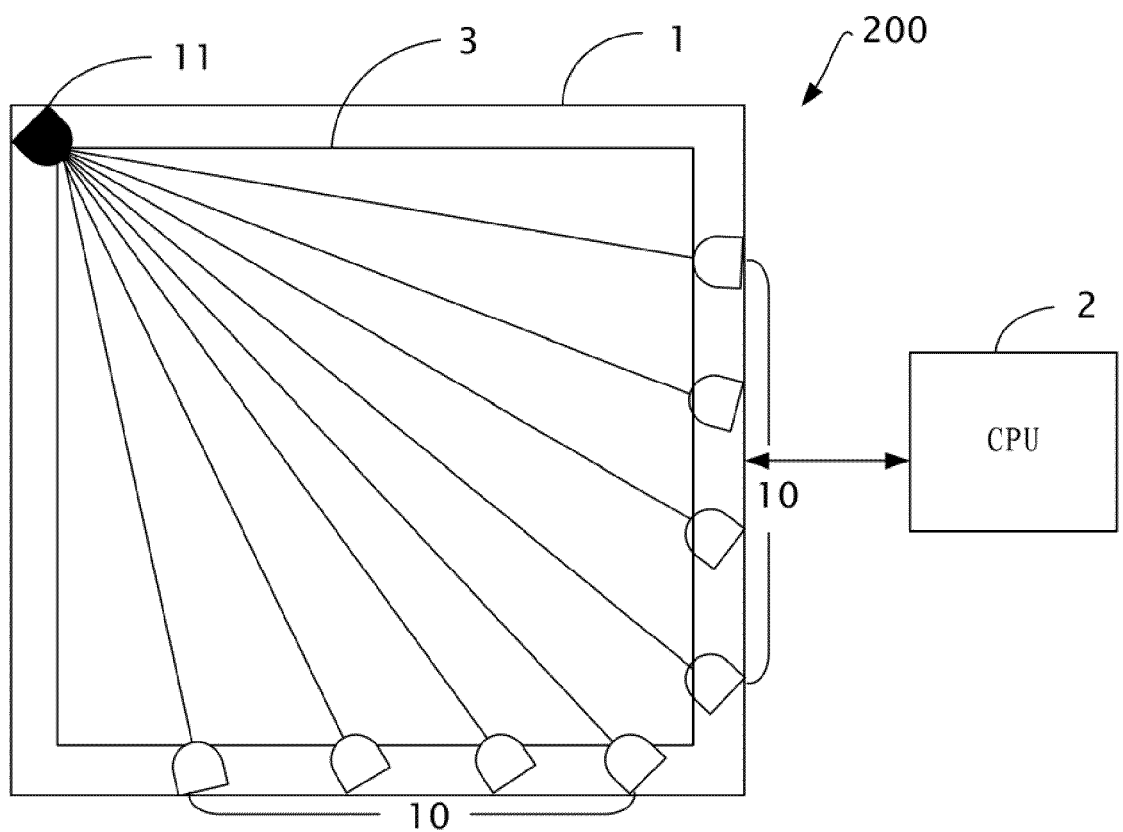
FIG. 4 is a schematic diagram showing an internal configuration of the electronic device of FIG. 1 in accordance with a second exemplary embodiment.

In FIG. 4, eight light emitting devices 10 are positioned on two adjacent sides of the circuit board 12, and one light detecting device 11 is positioned on one corner of the circuit board 12 faced to light emitting devices 10.

Figure 5:
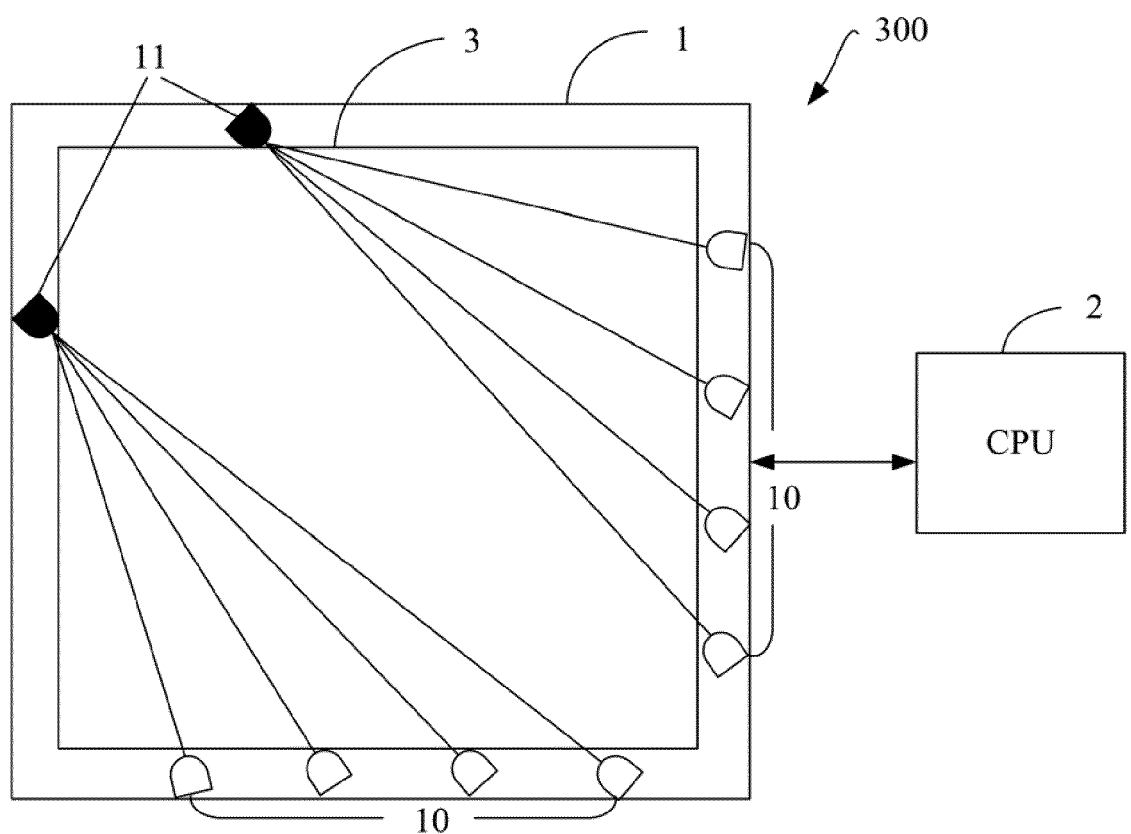
FIG. 5 is a schematic diagram showing an internal configuration of the electronic device of FIG. 1 in accordance with a third exemplary embodiment.

In FIG. 5, eight light emitting devices 10 are positioned on two adjacent sides of the circuit board 12, two light detecting devices 11 positioned on the circuit board 12, one light detecting device 11 is positioned at one corner of the circuit board 12 faced to the eight light emitting devices 10, and another light detecting device 11 is positioned near the corner.

Figure 6:
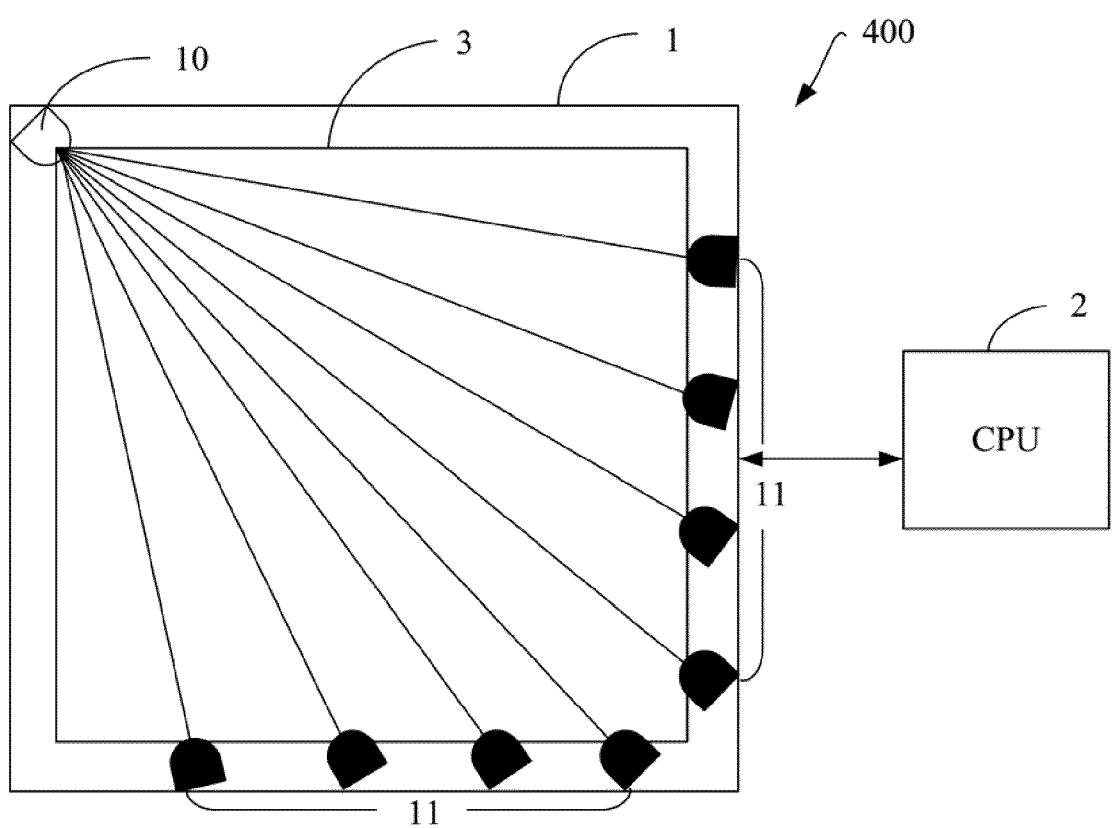
FIG. 6 is a schematic diagram showing an internal configuration of the electronic device of FIG. 1 in accordance with a fourth exemplary embodiment.

In FIG. 6, eight light detecting devices 11 are positioned on two adjacent sides of the circuit board 12, and one light emitting device 10 is positioned on one corner of the circuit board 12 faced to light detecting devices 11.

Figure 7:
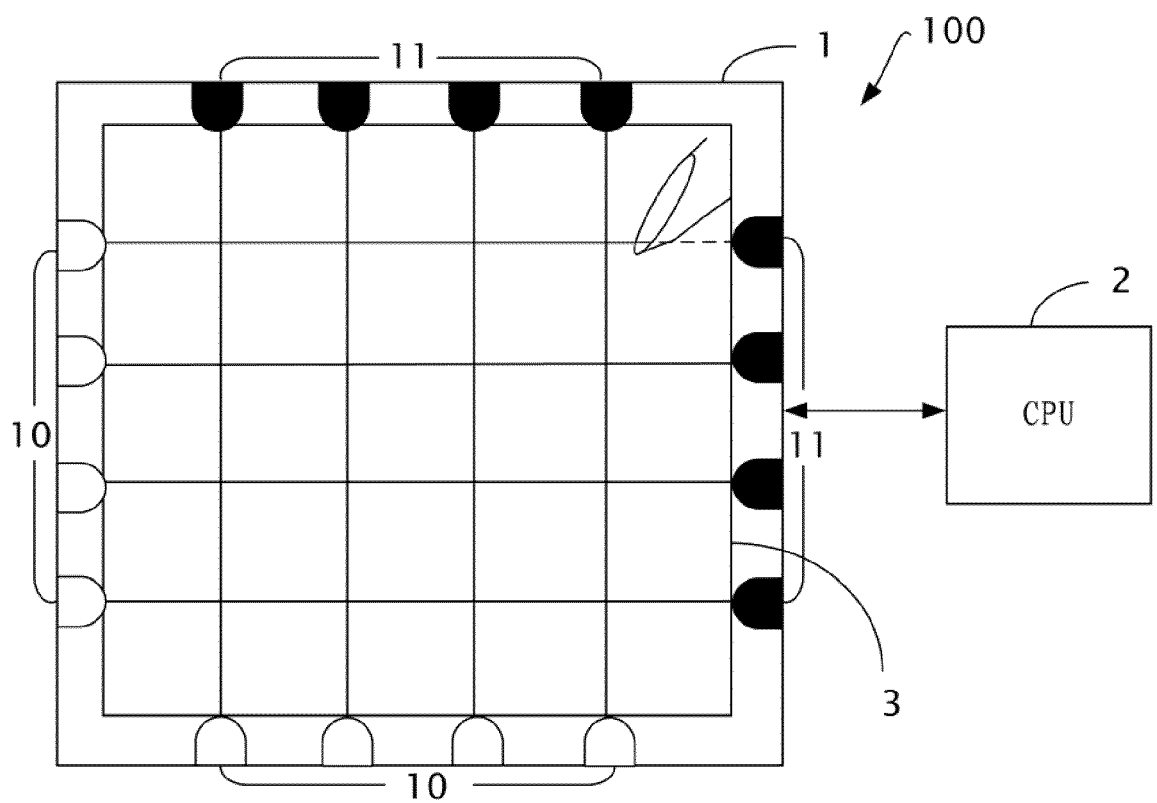
FIG. 7 is a schematic diagram showing a touch operation on the electronic device of FIG. 3.

FIG. 7 is a schematic diagram showing a touch operation on the electronic device of FIG. 3. When one touched operation is implemented on the electronic device 100, one infrared light path between the light emitting device 10 and the corresponding light detecting device 11 is obstructed, thereby the corresponding light detecting device 11 can not detect the infrared light emitted by the corresponding light emitting device 10. The micro-processor 13 sends the signal of the obstructed infrared light path to the CPU 2.

Figure 8:
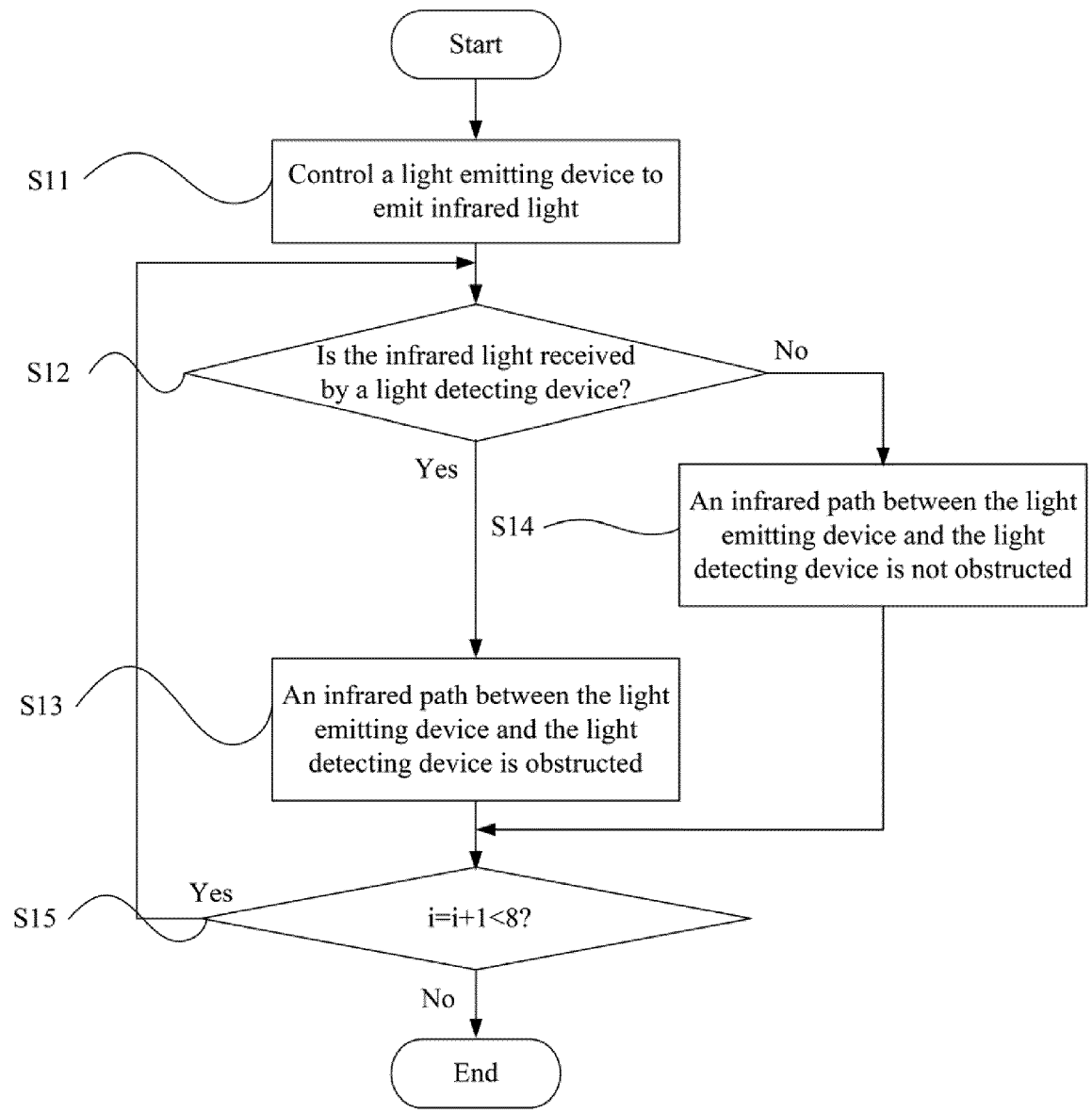
FIG. 8 is a flowchart of scanning implemented by the electronic device of FIG. 2 in one circular scan, in accordance with an embodiment.

FIG. 8 is a flowchart of scanning implemented by the electronic device of FIG. 2 in one scan. In step S11, the micro-processor 13 controls light emitting devices 10 to emit infrared light. In step S12, the micro-processor 13 controls one of the light detecting devices 11 to detect if the infrared light emitted by the light emitting device 10 is received. If yes, the procedure goes to step S13, otherwise, the procedure goes to S14. In step S13, the micro-processor 13 determines the infrared light path between the light emitting device 10 and the light detecting device 11 is obstructed, and sends the signal of the obstructed infrared light path to the CPU 2, and the procedure goes to S15. In step S14, the micro-processor 13 determines the corresponding menu option is not touched by the user, and the procedure goes to S15. In step S15, the micro-processor 13 determines whether I+1 is less than or equal to the total number of the light detecting devices 11, e.g., 8. If yes, the procedure goes to step S12, otherwise, the procedure ends.

Figure 9:
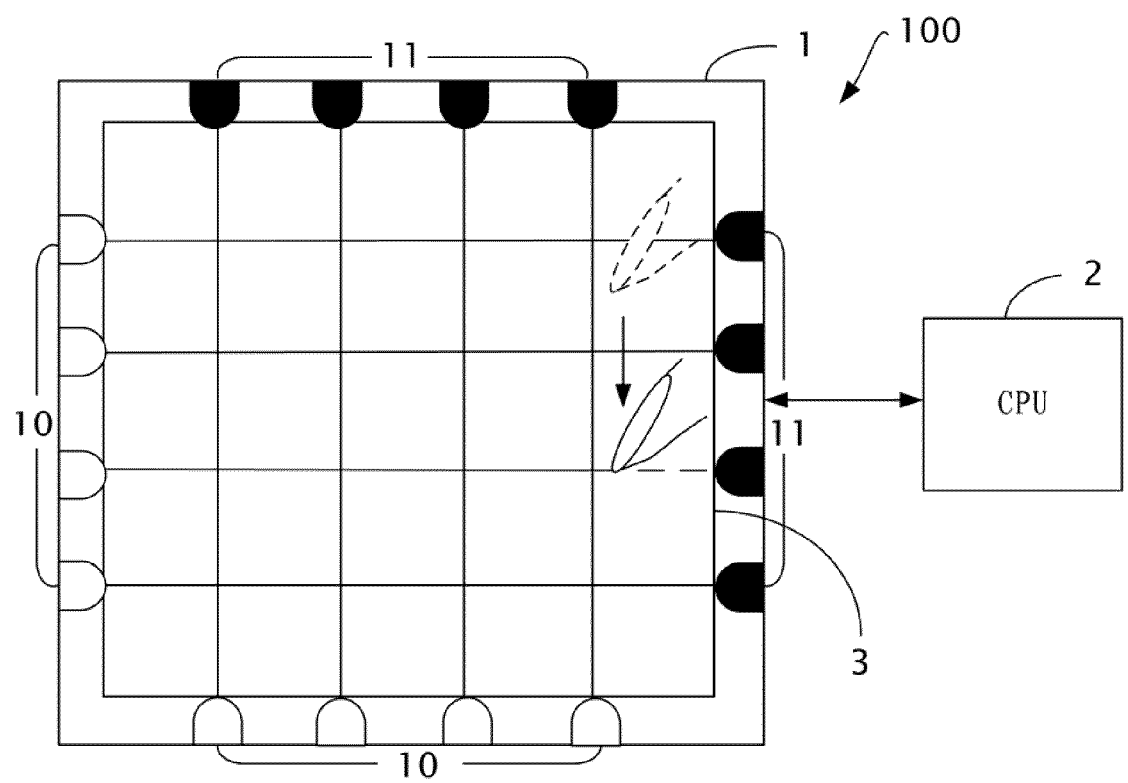
FIG. 9 is a schematic diagram showing a sliding operation on the electronic device of FIG. 3.

FIG. 9 is a schematic diagram showing a sliding operation on the electronic device of FIG. 3. When one sliding operation is implemented on the electronic device, two or more infrared light paths between the light emitting device 10 and the corresponding light detecting device 11 are obstructed in sequence. The micro-processor 13 sends the signals of all the obstructed infrared light paths to the CPU 2 in sequence. Therefore, the information includes not only which infrared light paths are obstructed, but also the order and/or number of the obstructed infrared light paths. The CPU 2 looks up to the table to determine the corresponding function according to the information.

Figure 10:
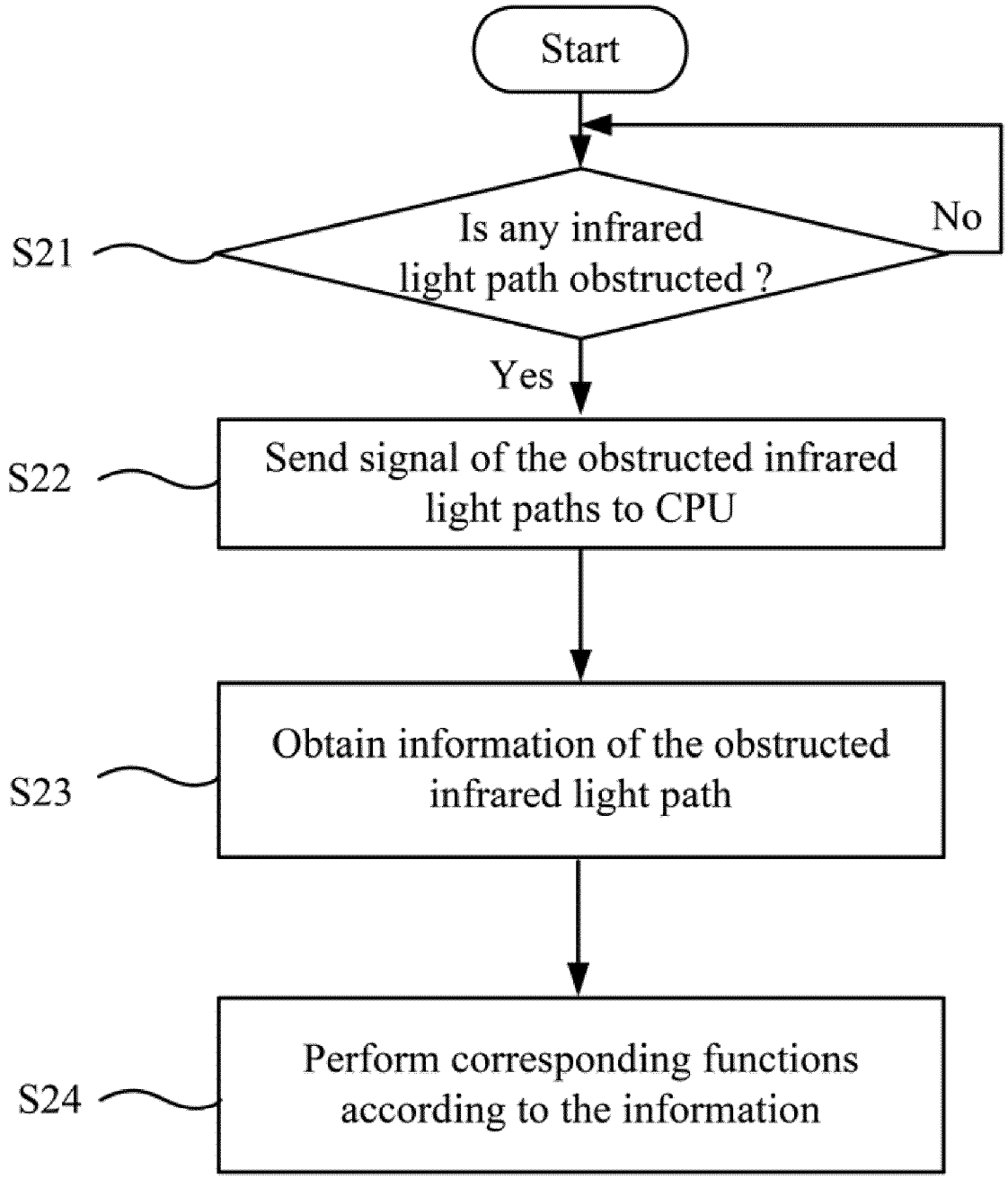
FIG. 10 is a flowchart of the sliding operation implemented by the electronic device of FIG. 2.

FIG. 10 is a flowchart of sliding operation implemented by the electronic device of FIG. 2. In step S21, the micro-processor 13 determines if any infrared light path is obstructed, if no, the micro-processor 13 continues detecting, if yes, the procedure goes to step S22. In step S22, the micro-processor sends all the signals of the obstructed infrared light paths to the CPU 2. In step 23, the CPU 2 obtains the information of the obstructed infrared light path including the order and the number of the obstructed infrared light paths if there are two or more signals received in a predetermined time from when the time the first signal is received. In step S24, the CPU 2 looks up the table according to the information to get corresponding function, and performs corresponding functions.

In order to avoid misoperation, in one scan, only when the time of the infrared light that is not received by the light emitting device 10 lasts for a second predetermined time, the micro-processor 13 sends the signal of the obstructed infrared light path to the CPU 2.

Although the present disclosure has been specifically described on the basis of an exemplary embodiment thereof, the disclosure is not to be construed as being limited thereto. Various changes or modifications may be made to the embodiments without departing from the scope and spirit of the disclosure.

What is claimed is:

1. An electronic device with infrared touch input function, comprising:
   a display unit defining an signal display area;
   an infrared input device comprising a circuit board having two pairs of oppositely disposed sides defining an open area corresponding in size and shape to the signal display area,
   at least one light emitting device positioned on the circuit board, configured for emitting infrared light;
   at least one light detecting device positioned on the circuit board, configured for detecting infrared light emitted by the light emitting device;
   a micro-processing unit configured for controlling the at least one light emitting device to emit infrared light, detecting infrared light paths obstructed via the light detecting devices, sending information of the obstructed infrared light paths to a central processing unit(CPU); and the CPU being configured for performing functions according to the information of the obstructed infrared light paths;
   wherein the at least one light emitting device is positioned on two adjacent sides of the circuit board, and the at least one light detecting device is positioned on one corner of the circuit board facing the light emitting devices, or the at least one light detecting device is positioned on two adjacent sides of the circuit board, and the at least one light emitting device is positioned on one corner of the circuit board faced to the light detecting devices;
   wherein the information of obstructed infrared light paths comprising two or three combinations of which infrared light paths are obstructed, order of the obstructed infrared light paths, and number of the obstructed infrared light path when there are two or more infrared light paths being obstructed in a predetermined time.

2. The electronic device as claimed in claim 1, wherein the display unit is a flat panel display.

3. The electronic device as claimed in claim 1, wherein the at least one light detecting device is an infrared phototransistor.

4. The electronic device as claimed in claim 1, wherein the at least one light emitting device is an organic light emitting diode.

5. The electronic device as claimed in claim 1, wherein the micro-processor sends the information of the obstructed infrared light path to the CPU when the time duration of the infrared light that is not received by the light emitting device lasts for a second predetermined time in one scan.

6. A method of controlling an electronic device with infrared touch input function, comprising:
   supplying a display unit defining an signal display area;
   supplying an infrared input device comprising a circuit board having two pairs of oppositely disposed sides defining an open area corresponding in size and shape to the signal display area,
   supplying at least one light emitting device positioned on the circuit board, configured for emitting infrared light;
   supplying at least one light detecting device positioned on the circuit board, configured for detecting infrared light emitted by the at least one light emitting device;

wherein the at least one light emitting device is positioned on two adjacent sides of the circuit board, and the at least one light detecting device is positioned on one corner of the circuit board facing the light emitting devices, or the at least one light detecting device is positioned on two adjacent sides of the circuit board, and the at least one light emitting device is positioned on one corner of the circuit board facing the light detecting devices;

controlling the at least one light emitting device to emit infrared light, detecting infrared light paths obstructed via the light detecting devices;

sending information of obstructed infrared light paths to a CPU if any infrared light path is obstructed;

the CPU obtaining the information of the obstructed infrared light path including which infrared light paths are obstructed, order and/or number of the obstructed infrared light paths, if there are two or more infrared light paths are detected obstructed in a predetermined time from the first time one infrared light path is detected obstructed;

the CPU performing corresponding functions according to the information of the obstructed infrared light path.

7. The method of controlling an electronic device according to claim 6, comprising continuing detecting if any infrared light path is not obstructed.

8. The method of controlling an electronic device according to claim 6, comprising: the CPU obtaining the information of the obstructed infrared light path including which infrared light paths is obstructed if only one infrared light path is detected obstructed in a predetermined time from the first time one infrared light path is detected obstructed.

9. The method of controlling an electronic device according to claim 6, comprising:

controlling at least one light emitting device to emit infrared light;

controlling at least one light detecting device to detect if the infrared light emitted by the light emitting device is received;

determining the infrared light path between the light emitting device and the light detecting device is obstructed when the infrared light emitted by the light emitting device is received.

10. The method of controlling an electronic device according to claim 9, wherein the information of obstructed infrared light paths comprising which infrared light path is obstructed, when only one infrared light path is detected obstructed in a predetermined time.

11. The method of controlling an electronic device according to claim 9, wherein the information of obstructed infrared light paths comprising two or three combinations of which infrared light paths are obstructed, order of the obstructed infrared light paths, and number of the obstructed infrared light path when there are two or more infrared light paths being obstructed in a predetermined time.

12. The method of controlling an electronic device according to claim 11, comprising sending the information of the obstructed infrared light path to the CPU when the time duration of the infrared light that is not received by the light emitting device lasts for a second predetermined time in one scan.

* * * * *